United States Patent [19]

Fuse et al.

[11] Patent Number: 5,099,330
[45] Date of Patent: Mar. 24, 1992

[54] CONTRAST CONTROL BASED ON MEAN AND DEVIATION VALUES

[75] Inventors: Takahiro Fuse, Akigawa; Hideo Takizawa, Fuchu, both of Japan

[73] Assignee: Casio Computer Co., Ltd., Tokyo, Japan

[21] Appl. No.: 424,815

[22] Filed: Oct. 20, 1989

[30] Foreign Application Priority Data

Oct. 28, 1988 [JP] Japan .................. 63-270979
Sep. 28, 1989 [JP] Japan .................. 1-253572

[51] Int. Cl.⁵ .............................. H04N 5/57
[52] U.S. Cl. .................. 358/169; 358/236; 358/39
[58] Field of Search ............ 358/39, 168, 169, 236, 358/174

[56] References Cited

U.S. PATENT DOCUMENTS

| | | | |
|---|---|---|---|
| 4,231,065 | 10/1980 | Fitch et al. | 358/169 X |
| 4,253,110 | 2/1981 | Harwood et al. | 358/39 X |
| 4,635,119 | 1/1987 | Baker | 358/39 X |
| 4,654,710 | 3/1987 | Richard | 358/39 X |
| 4,745,461 | 5/1988 | Shirai et al. | 358/236 X |
| 4,785,352 | 11/1988 | Burrowes et al. | 358/174 |
| 4,829,381 | 5/1989 | Song et al. | 358/168 |
| 4,937,671 | 6/1990 | Engel | 358/169 |

FOREIGN PATENT DOCUMENTS

| | | |
|---|---|---|
| 62-188477 | 8/1987 | Japan . |
| 62-258565 | 11/1987 | Japan . |
| 62-281575 | 12/1987 | Japan . |
| 1-112878 | 5/1989 | Japan . |

*Primary Examiner*—James J. Groody
*Assistant Examiner*—Mark R. Powell
*Attorney, Agent, or Firm*—Frishauf, Holtz, Goodman & Woodward

[57] ABSTRACT

A contrast control circuit for processing a video signal comprises a digital video-signal processing circuit which detects a mean value of a digital luminance signal of the digital video signal and subtracts the detected mean value from the digital luminance signal in order to obtain a difference signal, and a limiter circuit which receives and limits the difference signal to a range defined by predetermined upper and lower limits. And a digital video-signal processing circuit including amplifier means for amplifying a digital luminance signal, obtains a mean value of one field of the digital luminance signal or of one field of the digital luminance signal amplified by the amplifier means, calculates deviations of the digital luminance signal or of the digital luminance signal amplified by the amplifier means from the obtained mean value, accumulates the deviations calculated for the period of one field in order to obtain a contrast value, and controls the gain of the amplifier means on the basis of the obtained contrast value.

13 Claims, 5 Drawing Sheets

CONTRAST CONTROL BASED ON MEAN AND DEVIATION VALUES

BACKGROUND OF THE INVENTION

In recent liquid crystal display television receivers, real-timer digital signal processing for video signals has been frequently employed, and among the television signal processings a base-band video-signal processing which is performed in a digital fashion has been put to practical use in a form of IDTV. The conventional digital video-signal processing circuit is constructed as shown in FIG. 1. More specifically, a composite video signal output from a video detector (not shown) is converted into a digital signal by an analog to digital converter (A/D converter) 11 and then separated into a luminance signal Y and a chrominance signal C by a luminance/chrominance separator circuit (Y/C separator circuit) 12. The chrominance signal C is demodulated into color-difference signals, R-Y and B-Y by a color-difference demodulator circuit 13 and transferred to a matrix circuit 14. In the matrix circuit 14, the color difference signals R-Y and B-Y are added to the luminance signal Y from Y/C separator circuit 12. As a result, color signals, R, G and B are obtained. Then these color signals R, G and B are sent to a liquid crystal display section (not shown) to be displayed on a liquid crystal display panel.

The above liquid crystal display panel provides a low gradient. Therefore, if the above liquid crystal display panel is not used efficiently, a picture with an adequate contrast of light and shade is not available on the above liquid crystal display panel. In the above conventional video-signal processing circuit, the luminance signal Y obtained by Y/C separator circuit 12 is directly input to the matrix circuit 14, which generates color signals R, G and B corresponding to a level of the luminance signal Y. Therefore, in case that a picture is of an average brightness, the color signals R, G, B vary with a median level of the luminance signal Y as their median level. Hence a picture can be displayed with adequate contrast or with a high gradient on the liquid crystal display panel. In case that a picture is a bright scene or a dark scene, and the level of the luminance signal Y is high or low, the color signals R, G, B from the matrix circuit 14 incline towards a high level or a low level. In this case, the liquid crystal display panel is used inefficiently so that a picture with an inadequate contrast of light and shade is displayed on the display panel.

SUMMARY OF THE INVENTION

The present invention has been made in consideration of the above described situations and its object is to provide a level control circuit which is capable of controlling the color signals such that they always vary with a mean value of the luminance signal as their median level and within a certain range even when the luminance signal various greatly, and which permits a picture to be displayed with high contrast of light and dark on the liquid crystal display panel.

According to the invention, there is provided a level control circuit used in a digital video-signal processing circuit, which comprises mean value detection means for detecting a mean value of a luminance signal composed of digital signals; subtraction means for subtracting the means value detected by said mean value detection means from the luminance signal; and restriction means for restricting an output signal from said subtraction means to a range defined by predetermined upper and lower limits.

The level control circuit constructed as described above outputs a signal having constant upper and lower levels and a mean value as the median level even though the luminance signal varies greatly. Accordingly, when the level-controlled luminance signal is added to color-difference signals, color signals R, G, B are obtained, which allow a picture to be displayed with an adequate gradient on the liquid crystal display panel.

BRIEF DESCRIPTION OF THE DRAWINGS

FIG. 2 is a block diagram of a digital video signal processing circuit according to the present invention;

FIG. 3 is a block diagram showing a detailed construction of a level control circuit;

FIG. 4 is a block diagram showing an embodiment of a mean value detection circuit;

FIG. 5 is a block diagram showing the level control circuit employing the means value detection circuit of FIG. 4;

DESCRIPTION OF THE PREFERRED EMBODIMENTS

Figure 1:
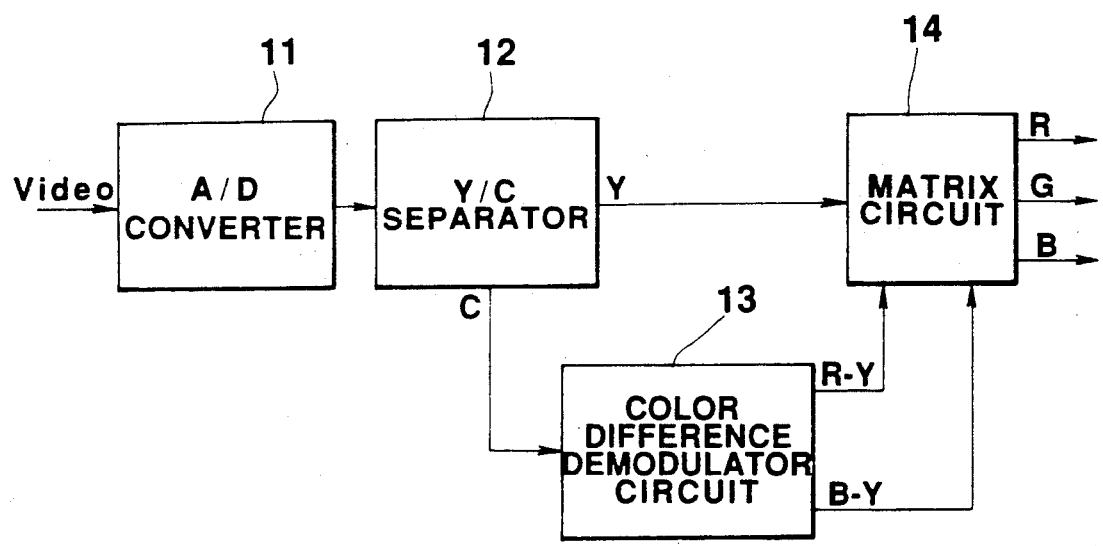
FIG. 1 is a block diagram showing a construction of a conventional digital-video-signal processing circuit.
Figure 2:
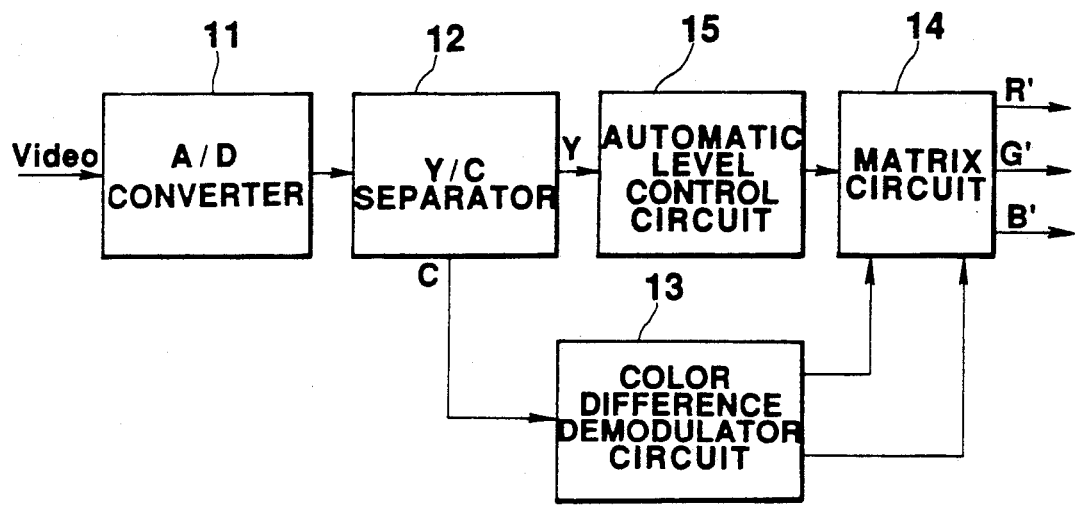
FIGS. 2 through 5 are views showing the first embodiment of the present invention.

Now, the first embodiment of the present invention will be described referring to the accompanying drawings. FIG. 2 is a view showing a construction of the digital-video-signal processing circuit. A composite video signal from a video detector (not shown) is subjected to a sampling process in an analog to digital converter (A/D converter) 11 thereby converted into a digital signal of several bits. Then the digital signal is transferred to Y/C separator circuit (luminance/-chrominance separator circuit) 12 to be separated into a luminance signal Y and a chrominance signal C. The chrominance signal C is demodulated by a color-difference demodulator circuit 13 into color-difference signals R-Y and B-Y and then further transferred to a matrix circuit 14. The luminance signal Y obtained by Y/C separator circuit 12 is supplied to a level control circuit 15. The level control circuit 15, as will be described in detail later, controls the level of the luminance signal Y from Y/C separator circuit 12 on the basis of a mean value of the luminance signal Y to obtain a luminance signal Y', which is further supplied to the matrix circuit 14. The matrix circuit 14 adds the luminance signal Y' to the color-difference signals, R-Y, B-Y from the color-difference demodulator circuit 13, thereby obtaining color signals R', G', B' A liquid crystal display display panel (not shown) is driven on the basis of the color signals, R', G', B'.

The detail of the level control circuit 15 will be described with reference to FIG. 3. The luminance signal Y from Y/C separator circuit 12 is supplied to a mean value detector circuit 21 and a positive terminal of a subtractor circuit 22. The mean value detector circuit 21 calculates the mean value $\overline{Y}$ of the luminance signal Y and supplies the same to a negative terminal of the subtractor circuit 22. The subtractor circuit 22 subtracts the calculated mean value $\overline{Y}$ from the luminance signal Y and supplies the difference to a limiting circuit 23. The limiting circuit 23 restricts the amplitude of the supplied signal to a range defined by predetermined upper and lower limits. Then the output signal of the limiting circuit 23 is supplied as the luminance signal Y' to the matrix circuit 14.

In the level control circuit having the above mentioned construction, a difference signal between the luminance signal Y and its mean value $\overline{Y}$ is obtained and the amplitude of the difference signal is restricted to a range defined by predetermined upper and lower limits. Only the part of the luminance signal Y which lie in a settled range above or below its mean value $\overline{Y}$ is selected and output as the luminance signal Y'. Then, the matrix circuit 14 extracts color signals R', G', B' from color-difference signals R-Y, B-Y on the basis of the luminance signal Y'. Hence, the color signals R', G', B' will have levels which lie within a settled range. The liquid crystal display panel is efficiently driven by the above color signals R', G', B' thereby displaying a picture with an adequate contrast of light and dark.

The above mentioned mean value detector circuit 1 calculates a mean value $\overline{Y}$ of one field of the luminance signal Y from the following equation:

$$Y = \sum_{i=1}^{n} Yi/n.$$

In this case, a memory and an adder circuit are used to obtain the mean value $\overline{Y}$ from the above equation. However, a number of memories and adder circuits are required to constitute the mean value detector circuit 21.

Figure 4:
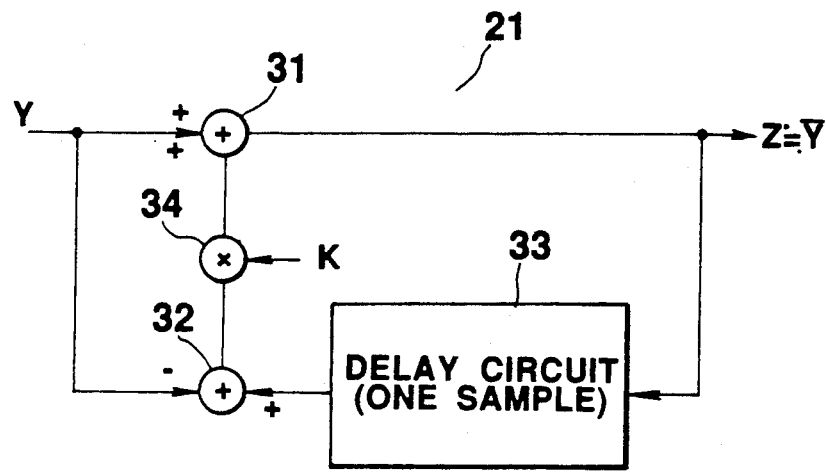

Meanwhile, the above mean value detector circuit 21 can be constructed with a simple circuit construction shown in FIG. 4. In the circuit shown in FIG. 4, a low-pass filter of a circular-adder type constitutes the mean value detector circuit 21, since a low-pass filter has a mean value detection function. More specifically, the luminance signal Y from Y/C separator circuit 12 is supplied to an adder circuit 31 and also to the negative terminal of a subtractor circuit 32. The output signal of the adder circuit 31 is supplied to the positive terminal of the above subtractor circuit 32 through a delay circuit 33 having a delay time of one sampling interval. The output signal of the subtractor circuit 32 is further supplied to a multiplier circuit 34. In the multiplier circuit 34, the output signal of the subtractor circuit 32 is multiplied by a given constant K and the product is input to the adder circuit 31. The adder circuit 31 adds the output signal of the adder circuit 34 to the luminance signal Y and supplies the sum to the delay circuit 33 and at the same time outputs the sum as the mean value $\overline{Y}$ of the luminance signal Y.

In the circuit of FIG. 4, an output signal Zn-1 sampled previously by one sampling time is retained in the delay circuit 33, at the time when a luminance signal Yn is input. Accordingly, in the subtractor circuit 32, a subtraction, Zn−1, − Yn is executed and the difference is multiplied by a constant K in the multiplier circuit 34. Then, the product K(Zn−1 − Yn) is supplied to the adder circuit 31. The adder circuit 31 adds the luminance signal Yn to the output signal K(Zn−1 − Yn) of the multiplier circuit 34. The sum Zn i.e., Yn + K(Zn−1 − Yn) is output as the mean value $\overline{Y}$n of the luminance signal Yn.

Accordingly, the signal processing in FIG. 4 will be expressed by $$\overline{Y}n \approx Zn = Yn + K(Zn-1-Yn)$$

Figure 3:
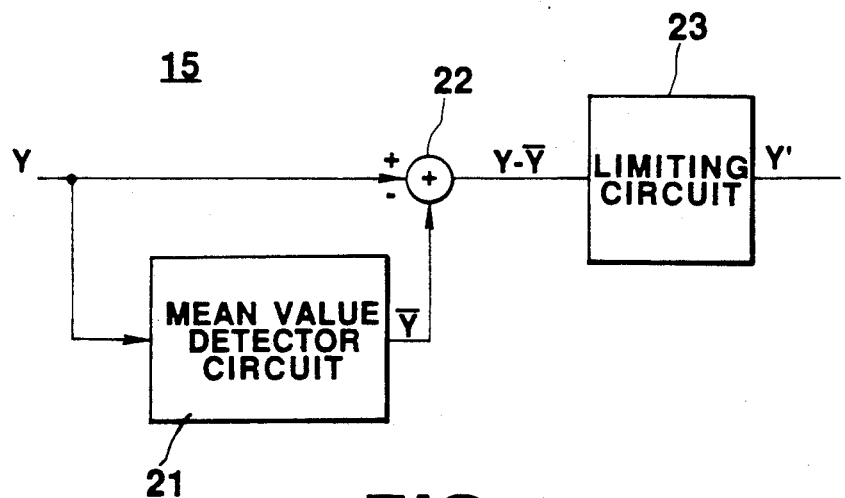

The mean value $\overline{Y}$n of the luminance signal Yn obtained by the above mean value detector circuit 21 is transferred to the subtrator circuit 22 of FIG. 3, where a subtraction, Y-$\overline{Y}$ is executed. In this case, the difference is given by $$\begin{aligned} Yn - \overline{Y}n &\approx Yn - Zn \\ &\approx Yn - Yn - K(Zn - 1 - Yn) \\ &\approx -K(Zn - 1 - Yn) \end{aligned}$$

Figure 5:
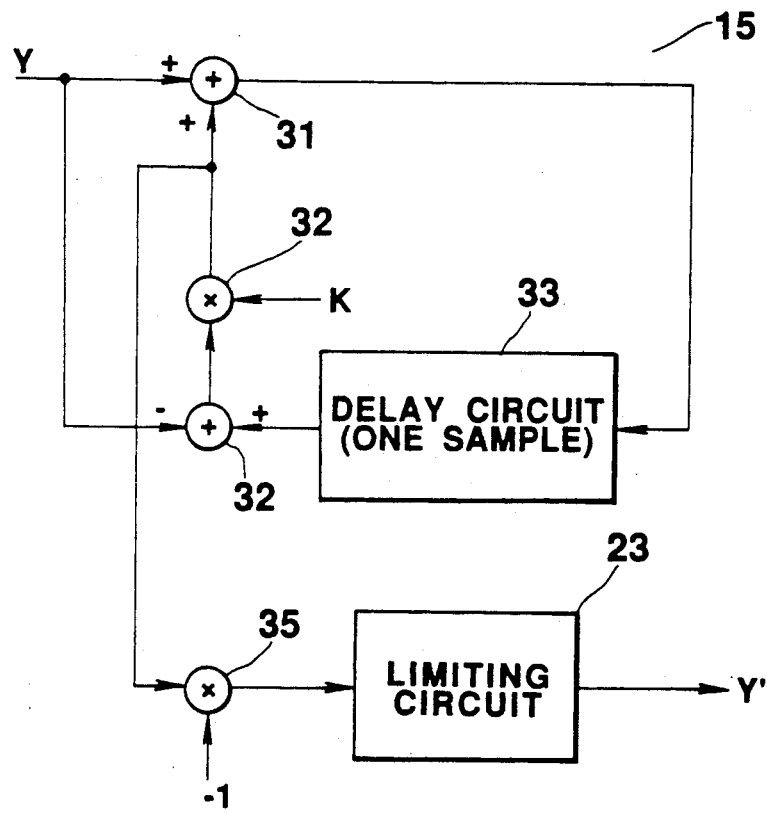

As shown in FIG. 4, when the low-pass filter of a circular adder type is employed to constitute the mean value detector circuit 21, the level control circuit 15 of FIG. 3 may be constructed as shown in FIG. 5. The signal "K(Zn−1− Yn)" supplied from the multiplier circuit 34 is multiplied by "−1" in a multiplier circuit 35 and then the signal, "−K(Zn−1 − Yn)" is obtained. The limiting circuit 23 restricts the output signal of the multiplier circuit 35 to a range defined by the upper and lower limits, and then outputs the restricted signal as the output signal Y' of the level control circuit 15.

It will be apparent from the above description that with use of the level control circuit having a vary simple construction. The initial object can be achieved Now, the second embodiment of the present invention will be described with reference to FIGS. 6 and 7.

Figure 6:
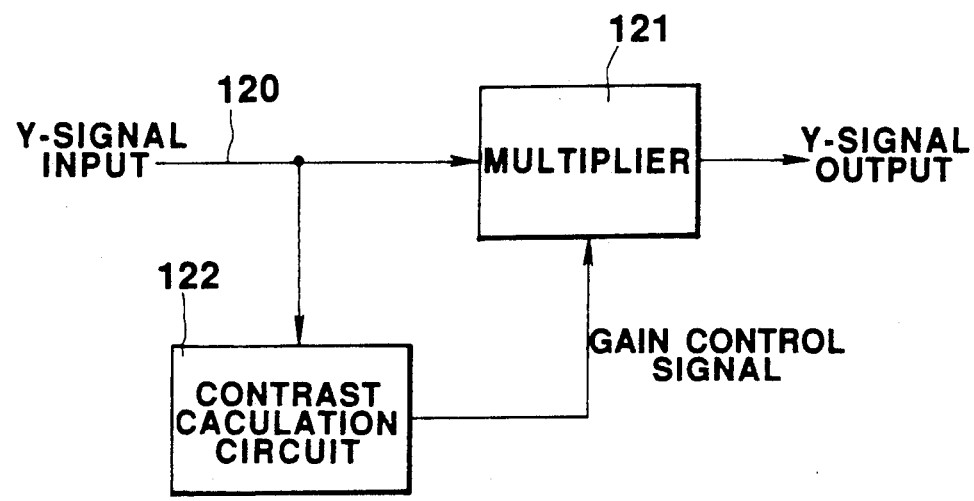
FIG. 6 is a block diagram showing an overall construction of a contrast calculation circuit according to the second embodiment of the invention.
Figure 7:
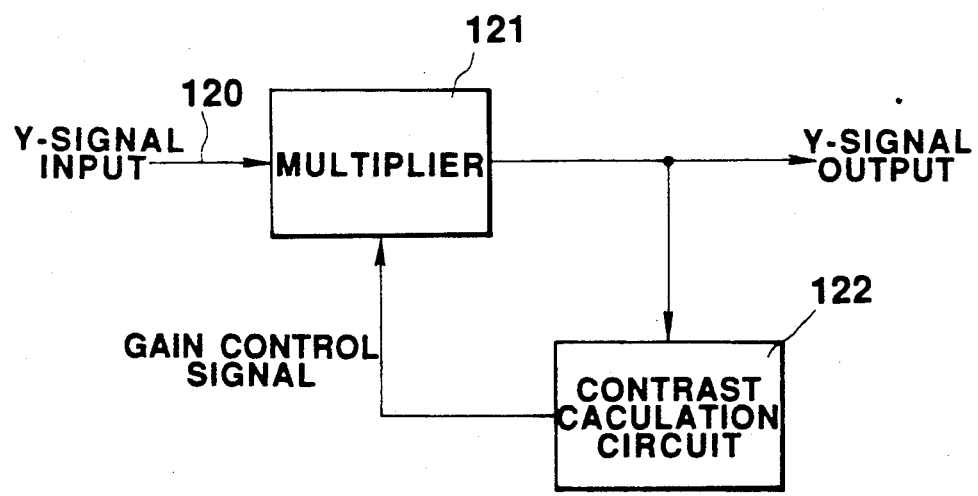
FIG. 7 is a block diagram showing a detail of the contrast calculation circuit of FIG. 6.

FIG. 6 is a block diagram showing a construction of a contrast circuit portion in the digital-video-signal processing circuit. A video signal is separated into a chrominance signal and a luminance signal Y in a preceding luminance/chrominance signal separator stage (not shown). The separated luminance signal Y is a binary-digit data, for example, of 6 bits and with a symbol. The luminance signal Y is supplied through a signal line 120 to an amplifier stage, e.g., a multiplier circuit 121 and a contrast calculation circuit 122. The contrast calculation circuit 122, as will be described in detail later, calculates a contrast value from the above luminance signal Y and sets a gaincontrol signal on the basis of the contrast value. The gain-control signal is supplied to a multiplier circuit 121. The multiplier circuit 121 executes a multiplication processing for the above luminance signal Y on the basis of the gain-control signal from the contrast calculation circuit 122 and outputs the product as an output signal of a contrast circuit to a following processing circuit, e.g., a matrix circuit (not shown). The matrix circuit adds the color difference signals R−Y, B−Y demodulated by a color-demodulator circuit (not shown) to the luminance signal Y from the above multiplier circuit 121. Thereby reproducing color signals R, G, B to a display driving circuit (not shown). The display driving circuit drives the liquid crystal display panel (not shown) on the basis of the reproduced color signals R, G, B.

Figure 8:
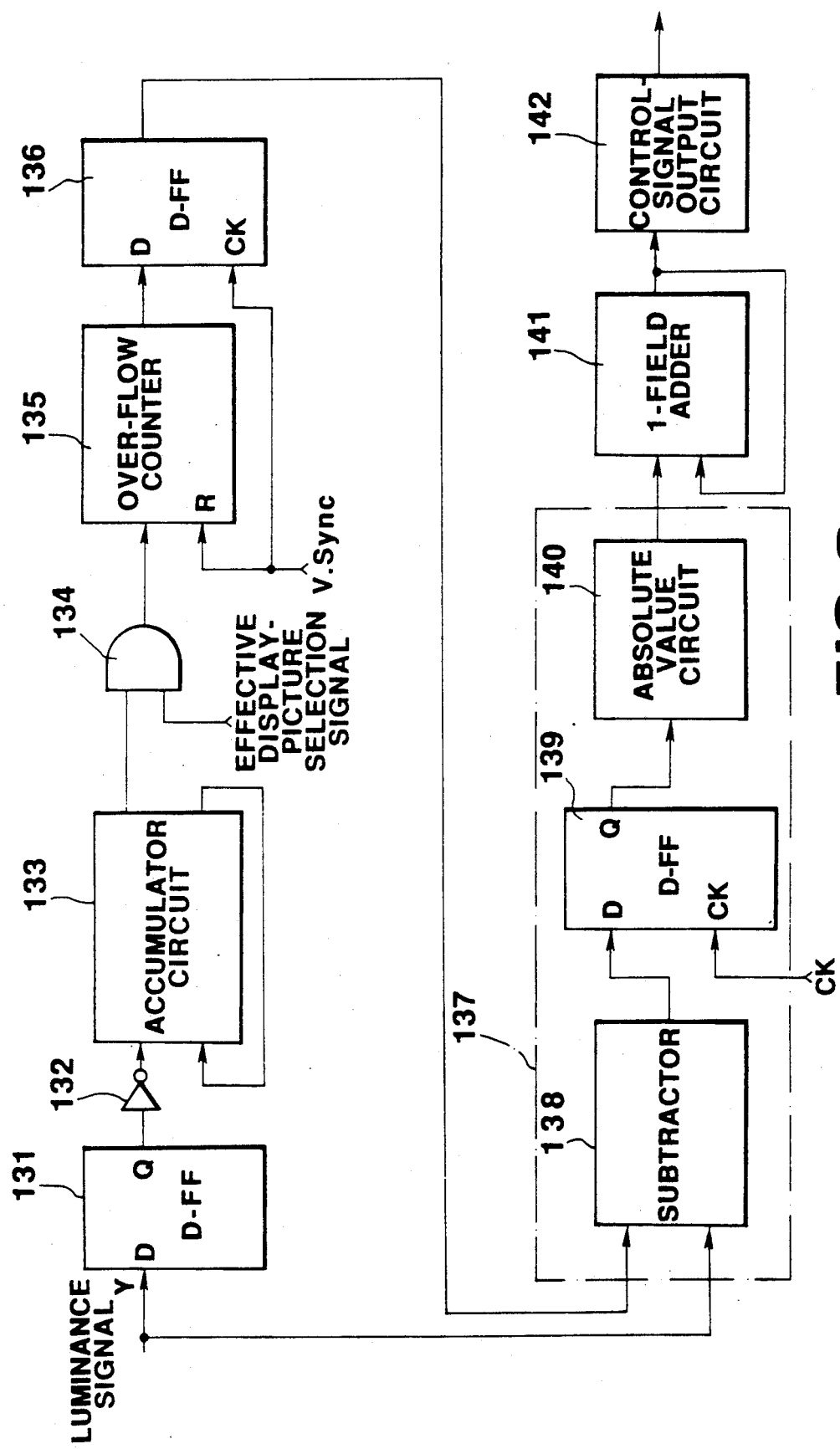
FIG. 8 is a block diagram showing other embodiment of the present invention.

FIG. 8 is a view showing the detail of the above contrast calculation circuit 122. The luminance signal Y of 6 bits transferred from a preceding processing circuit through the signal line 120 is supplied to a data input terminal D of a flip flop circuit 131 of a D-type. The D type flip-flop circuit 131 latches the luminance signal Y in synchronism with clock pulses CK and outputs the latched luminance signal Y through an invertor circuit 132 to an accumulator circuit 133. The accumulator circuit 133 accumulates the supplied data and outputs an over-flow signal caused by accumulation of data to one input terminal of an AND circuit 134. The AND circuit 134 serves to limit a range of the accumulated data to an effective display-picture. An effective display-picture selection signal for excluding the data in the blanking periods from the data is supplied to the other terminal of the AND circuit 134. The output signal for the above AND circuit 134 is supplied to an over-flow counter 135. The over-flow counter 135 counts number of times when over-flows are caused and supplies the count-output to the data input terminal D of a D-type flip-flop circuit 136. The flip-flop circuit 136 latches the value of the flip-flop circuit 136 in accordance with vertical synchronizing signals V sync which are supplied to its clock terminal CK at intervals of one field. At this time, the count value of the over-flow counter 135 is reset by the above synchronizing signals V sync.

The output signal of the above flip-flop circuit 136 is supplied to a luminance-deviation calculation circuit 137, which is composed of a subtractor circuit 138, a D-type flip-flop circuit 139 and an absolute value circuit 40. The output signal of the above flip-flop circuit 136 is supplied to the negative terminal of the subtractor circuit 138. To the positive terminal of the subtractor circuit 138 is supplied the luminance signal Y transferred from the preceding circuit through the signal line 120. The output signal of the subtractor circuit 138 is latched in the flip flop circuit 139 in synchronism with the clock pulses CK and is supplied to the absolute value circuit 110. The absolute value circuit 140 is composed of, for example, an exclusive OR circuit and obtains an absolute value of the data latched in the flip-flop circuit 139 and then supplies the absolute value to an one-field adder circuit 141.

The one-field adder circuit 141 composed of the above delay circuit 133, multiplier circuit 134, 135, accumulates absolute values which are output from the absolute value circuit 140 during the period of one field in order to obtain and supply a contrast value to a control-signal circuit 142.

The control-signal output circuit 142 subtracts a certain rate of the contrast value, i.e., a certain rate of the output signal of the one-field adder circuit 141 from the multiplier constant in the multiplier circuit 121 of FIG. 6, thereby producing a gain control signal. The gain control signal is supplied to the multiplier circuit 121 to control its gain.

Now, the operation of the above contrast calculation circuit 122 will be described. The luminance signal Y of 6 bits and having a symbol, which are supplied to the flip-flop circuit 131 through the signal line 120, is latched in the circuit 131 in synchronism with the clock pulses CK and further is supplied to the invertor circuit 132 to be inverted into a positive luminance data. The positive luminance data is accumulated by the accumulator circuit 133. The accumulator circuit 133 sequentially accumulates input data and supplies an over-flow signal to the AND circuit 134 to limit the range of the data to be accumulated when an over flow of the accumulated data occurs. The output signal of AND circuit 134 is supplied to the over-flow counter 135 to be counted. In other words, number of times when accumulator circuit 133 causes over-flows is counted by the over-flow counter 135. The count values are latched in the flip-flop circuit 136 at intervals of one field in synchronism with the vertical synchronizing signal. At this time, the above over-flow counter 135 is reset in accordance with the vertical synchronizing signal. In the above mentioned process, the mean value of one field of the luminance signal Y is latched in the flip-flop circuit 136.

The mean value of the luminance signal Y latched in the flip-flop circuit 136 is supplied to the luminance deviation calculator circuit 137, which calculates a luminance deviation. More specifically, in the luminance deviation calculator circuit 137, the subtraction circuit 138 subtracts the mean value of the luminance signal Y latched in the flip-flop circuit 136 from the luminance signal Y input to the circuit 138 through the signal line 120 and latches the difference in the flip-flop circuit 139 in synchronism with the clock pulses CK. In this manner, deviation from the mean value of each luminance signal is obtained. The deviation latched in the flip-flop circuit 139 is supplied to the absolute value circuit 140. The absolute value circuit 140 obtains an absolute value of the supplied deviation and outputs the absolute value as the output signal of the luminance deviation calculator circuit 137.

One-field adder circuit 141 accumulates deviations which are output from the luminance deviation calculator circuit 137 during the period of one field, thereby obtaining a contrast value.

Thereafter, the control signal output circuit 142 subtracts a certain rate of the contrast value, i.e., a certain rate of the output signal of the above one-field adder circuit 141 from the multiplier constant of the multiplier circuit 121 of FIG. 6, thereby obtaining a gain-control signal. The above rate of the contrast value to be subtracted from the multiplier constant decides a level of automatic contrast adjustment. In case that the rate of the contrast value to be subtracted from the multiplier constant is "zero", no automatic contrast adjustment is effected. When the above rate of the contrast value is gradually increased from "zero", the automatic contrast adjustment functions and provides a desired effect at a certain rate of the contrast value to be subtracted from the multiplier constant.

In the above embodiment, deviation of a luminance signal from its mean value is effectively used to control gain of the amplifier means, so that the gain of the amplifier means can be appropriately controlled in accordance with the amplitude level of the luminance signal and a picture can be always displayed with steady contrast, even though the picture is of a light scene or of a dark scene, i.e., even though the luminance signal is of a relatively high level or of a relatively low level. For example, even though the luminance signal of a picture lies at around white level and varies slightly, the control-signal output circuit 142 generates a gain-control signal corresponding to the amplitude level of the luminance signal and the gain of the multiplier circuit 121 is increased so as to allow the picture to be displayed with adequate contrast.

In the above mentioned embodiment, it has been described that the luminance signal Y transferred through the signal line 120 is supplied to the multiplier circuit 121 and at the same time to the contrast calculation circuit 122 in order to obtain a contrast value. However, as shown in FIG. 8, the output signal of the multiplier circuit 121 may be supplied to the contrast calculator circuit 122 to obtain the contrast value. In this manner, it is possible to obtain effects similar to those provided by the above described embodiment.

What is claimed is:

1. A level control circuit in a digital-video-signal processing circuit which processes a digital video signal which includes a digital luminance signal and a digital chrominance signal, the level control circuit comprising:
   mean value detection means for detecting a mean value of the digital luminance signal;
   subtraction means for subtracting the mean value detected by said mean value detection means from the digital luminance signal to provide a difference signal;
   restricting means for restricting the difference signal produced by said subtraction means to a range defined by predetermined upper and lower limits, to thereby output a luminance signal having a level varying in a certain range with the mean value detected by said mean value detection means as the median value; and
   liquid-crystal display panel driving means for driving a liquid-crystal display panel with the output luminance signal outputted by said restriction means.

2. A level control circuit in a digital-video-signal processing circuit comprising:
   amplifier means for amplifying a digital luminance signal;
   mean-value calculation means for calculating a mean value of a predetermined period of the digital luminance signal;
   luminance deviation-value calculation means for calculating deviation values of the predetermined period of the digital luminance signal from the mean value calculated by said mean-value calculation means;
   addition means for summing the deviation values of the predetermined period of the digital luminance signal calculated by said luminance deviation-value calculation means, thereby obtaining and outputting a contrast value; and
   gain control means for controlling gain of said amplifier means on the basis of the contrast value output from said addition means.

3. A level control circuit according to claim 2, wherein said mean-value calculation means calculates a mean value of one-field period of the digital luminance signal amplified by said amplifier means.

4. A level control circuit in a digital-video-signal processing circuit which processes a digital video signal which includes a digital luminance signal and a digital chrominance signal, the level control circuit comprising:
   amplifier means for amplifying the digital luminance signal;
   mean-value calculation means for calculating a mean value of a predetermined period of the digital luminance signal amplified by said amplifier means;
   luminance deviation-value calculation means for calculating deviation values of the predetermined period of the digital luminance signal form the mean value calculated by said mean-value calculation means;
   addition means for summing the deviation values of the predetermined period of the digital luminance signal calculated by said luminance deviation-value calculation means with the mean value calculated by said means-value calculation means, thereby obtaining and outputting a contrast value; and
   gain control means for controlling gain of said amplifier means on the basis of the contrast value output from said addition means.

5. A level control circuit according to claim 4, wherein said means-value calculation means calculates a mean value of one-field period of the digital luminance signal amplified by said amplifier means.

6. A liquid-crystal display device comprising:
   luminance/chrominance signal separation means for obtaining a digital luminance signal and a digital chrominance signal from a video signal;
   mean-value detection means for detecting a mean value of the digital luminance signal obtained by said luminance/chrominance signal separation means;
   subtraction means for subtracting the mean value of the luminance signal detected by said mean value detection means from the digital luminance signal to produce a difference signal;
   restriction means for restricting the difference signal produced by said subtraction means to a range defined by predetermined upper and lower limits, to thereby output a luminance signal having a level varying in a certain range with the mean value detected by said mean value detection means as the median value;
   driving-signal developing means for producing a liquid-crystal-driving signal from the output luminance signal outputted by said restriction means and the digital chrominance signal obtained by said luminance/chrominance signal separation means; and
   a liquid-crystal display panel means driven by the liquid-crystal-driving signal produced by said driving-signal developing means.

7. A liquid crystal display device comprising:
   luminance/chrominance signal separation means for obtaining and outputting a digital luminance signal and a digital chrominance signal form a digital video signal;
   amplifier means for amplifying the digital luminance signal output from said luminance/chrominance signal separation means;
   mean-value calculation means for calculating a mean value of a predetermined period of the digital luminance signal obtained and output by said luminance/chrominance signal separation means;
   luminance deviation-value calculation means for calculating deviation values of the predetermined period of the digital luminance signal from the mean value of the digital luminance signal calculated by said mean-value calculation means;
   addition means for summing the deviation values of the predetermined period of the digital luminance signal calculated by said luminance deviation calculation means, thereby obtaining and outputting a contrast value;
   gain control means for controlling gain of said amplifier means on the basis of the contrast value output from said addition means;
   drive means for producing a liquid-crystal drive signal from an output signal supplied by said gain control means and the digital chrominance signal output by said luminance/chrominance signal separation means; and
   a liquid-crystal display panel driven by said liquid-crystal drive signal from said drive means.

8. A level control circuit according to claim 1, wherein said mean value detection means comprises:
addition means for receiving the digital luminance signal, and for developing an output signal;
delay means connected to said addition means for delaying the output signal of said addition means;
comparison means for comparing the delayed output signal with the digital luminance signal to produce a remainder signal; and
multiplication means for multiplying the produced remainder signal by a constant, and for supplying the result of the multiplication to said addition means;
and wherein said addition means adds a result of the multiplication to the received digital luminance signal to develop the output signal of said addition means.

9. A level control circuit according to claim 1, wherein said mean value detection means includes means for calculating a mean value of the digital luminance signal of one field period.

10. A liquid-crystal display device according to claim 6, wherein said mean-value detection means comprises:
addition means for receiving the digital luminance signal, and for developing an output signal;
delay means connected to said addition means for delaying the output signal of said addition means;
comparison means for comparing the delayed output signal with the digital luminance signal to produce a remainder signal; and
multiplication means for multiplying the produced remainder signal by a constant, and for supplying the result of the multiplication to said addition means;
and wherein said addition means adds a result of the multiplication to the received digital luminance signal to develop the output signal of said addition means.

11. A liquid-crystal display device according to claim 6, wherein said mean-value detection means includes means for calculating a mean value for the digital luminance signal of one field period.

12. A digital video signal processing circuit for processing a digital video signal which includes a digital luminance signal and a digital chrominance signal, the processing circuit comprising:
amplifier means for amplifying the digital luminance signal;
means-value calculation means for calculating a mean value of the digital luminance signal of a predetermined number of fields;
deviation-value calculation means for calculating a deviation value of the digital luminance signal for the predetermined number of fields, using the mean value calculated by said mean-value calculation means;
addition means for adding deviation values of several digital luminance signals of the predetermined number of fields to obtain a contrast value; and
gain control means for controlling a gain of said amplifier means on the basis of the contrast value obtained by said addition means.

13. A digital video signal processing circuit according to claim 12, wherein said mean-value calculation means calculates said mean-value of the digital luminance signal of a predetermined number of fields, as amplified by said amplifier means; and wherein said addition means adds deviation values of several luminance signals of the predetermined number of fields to obtain the contrast value.

* * * * *